United States Patent
Yamaji

(10) Patent No.: US 9,734,612 B2
(45) Date of Patent: Aug. 15, 2017

(54) REGION DETECTION DEVICE, REGION DETECTION METHOD, IMAGE PROCESSING APPARATUS, IMAGE PROCESSING METHOD, PROGRAM, AND RECORDING MEDIUM

(71) Applicant: FUJIFILM Corporation, Tokyo (JP)

(72) Inventor: Kei Yamaji, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 5 days.

(21) Appl. No.: 14/847,364

(22) Filed: Sep. 8, 2015

(65) Prior Publication Data

US 2016/0086342 A1 Mar. 24, 2016

(30) Foreign Application Priority Data

Sep. 24, 2014 (JP) .................................. 2014-193820

(51) Int. Cl.
  *G06K 9/00* (2006.01)
  *G06T 11/60* (2006.01)
  *G06T 7/215* (2017.01)
  *G06T 7/246* (2017.01)
(52) U.S. Cl.
  CPC .............. *G06T 11/60* (2013.01); *G06T 7/215* (2017.01); *G06T 7/246* (2017.01); *G06K 9/00228* (2013.01); *G06T 2207/10016* (2013.01)
(58) Field of Classification Search
  CPC ..... G06T 11/60; G06T 7/2006; G06T 7/2033; G06T 9/00228; G06T 2207/10016
  See application file for complete search history.

(56) References Cited

U.S. PATENT DOCUMENTS

| 5,323,470 A * | 6/1994 | Kara ..................... B25J 9/1697 348/169 |
| 8,917,905 B1 * | 12/2014 | Dill ......................... A63J 1/02 362/145 |
| 2010/0104266 A1 * | 4/2010 | Yashiro ............. G06K 9/00295 386/201 |
| 2010/0284568 A1 * | 11/2010 | Tojo ................... G06K 9/00261 382/103 |

(Continued)

FOREIGN PATENT DOCUMENTS

| JP | 2009-075802 | 4/2009 |
| JP | 2010-109592 | 5/2010 |

*Primary Examiner* — Jonathan S Lee
(74) *Attorney, Agent, or Firm* — Young & Thompson

(57) ABSTRACT

The image processing apparatus includes a region detection unit that detects a face region of the attention person, an attention person movement region of the moving image, the entire region of the attention person, and an attention person transfer region of the moving image, a region image extraction unit that extracts an image of the face region of the attention person, an image of the attention person movement region of the moving image, an image of the entire region of the attention person, and an image of the attention person transfer region of the moving image, which respectively correspond to the face region of the attention person, the attention person movement region of the moving image, the entire region of the attention person, and the attention person transfer region of the moving image, from the still image, and a composite image generation unit that generates a composite image.

20 Claims, 13 Drawing Sheets

(56) References Cited

U.S. PATENT DOCUMENTS

| | | | |
|---|---|---|---|
| 2011/0235855 A1* | 9/2011 | Smith | G06F 3/0304 |
| | | | 382/103 |
| 2011/0279641 A1* | 11/2011 | Wang | G06T 3/0093 |
| | | | 348/42 |
| 2012/0114176 A1* | 5/2012 | Kawano | G06K 9/00771 |
| | | | 382/103 |
| 2012/0146789 A1* | 6/2012 | De Luca | G08B 21/12 |
| | | | 340/540 |
| 2012/0274781 A1* | 11/2012 | Shet | G06T 7/277 |
| | | | 348/169 |
| 2013/0027300 A1* | 1/2013 | Nakasu | G06F 3/017 |
| | | | 345/158 |
| 2014/0300746 A1* | 10/2014 | Adachi | G06K 9/00771 |
| | | | 348/159 |
| 2014/0369555 A1* | 12/2014 | Zhong | G06K 9/3233 |
| | | | 382/103 |
| 2015/0278606 A1* | 10/2015 | Laksono | G06K 9/00744 |
| | | | 382/103 |
| 2015/0286872 A1* | 10/2015 | Medioni | G06T 7/20 |
| | | | 382/103 |
| 2016/0019415 A1* | 1/2016 | Ra | G06K 9/00268 |
| | | | 382/197 |
| 2016/0232234 A1* | 8/2016 | Baek | G06F 17/30793 |
| 2016/0267325 A1* | 9/2016 | Sundaresan | G06K 9/00624 |

* cited by examiner

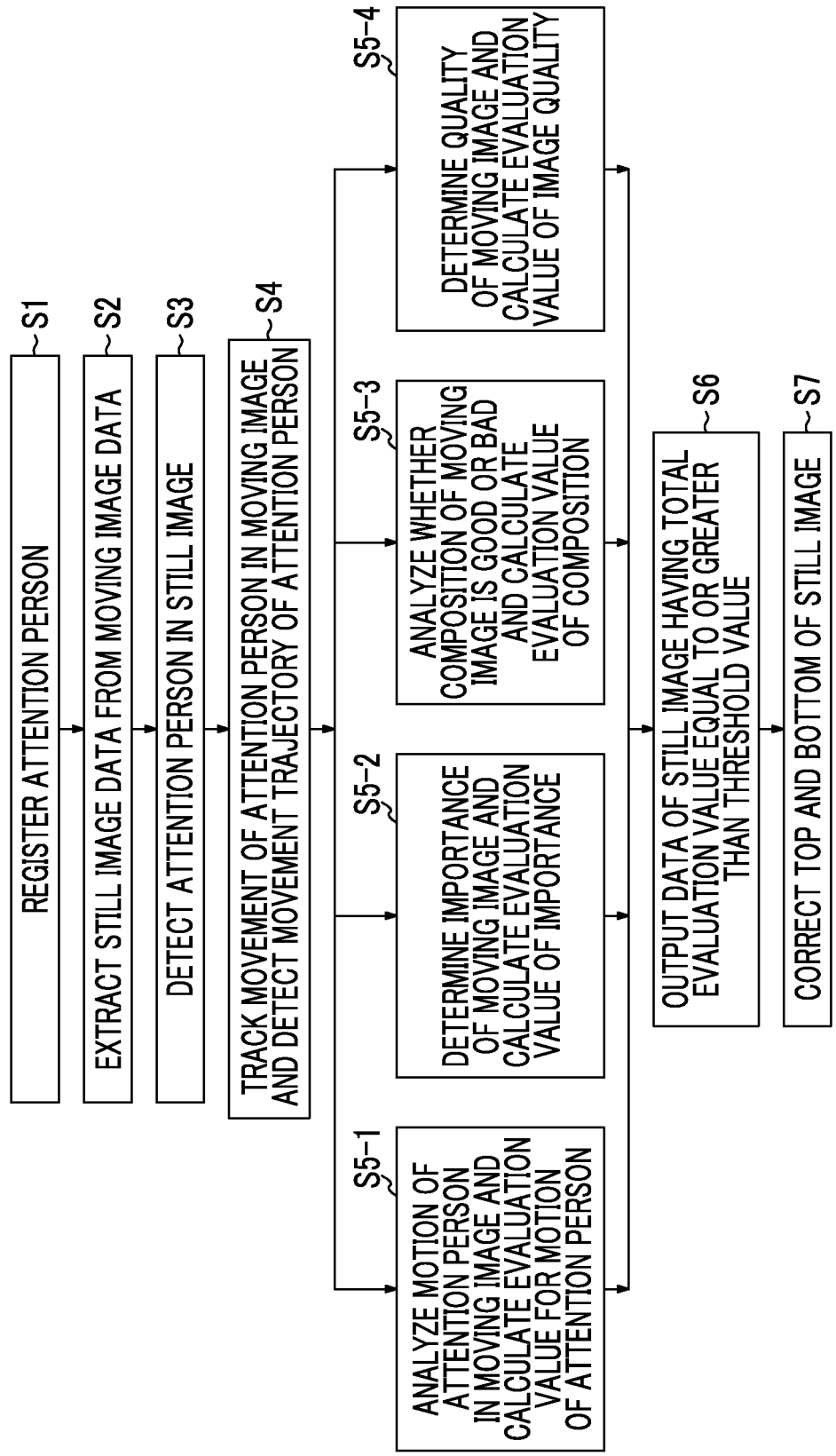

FIG. 7
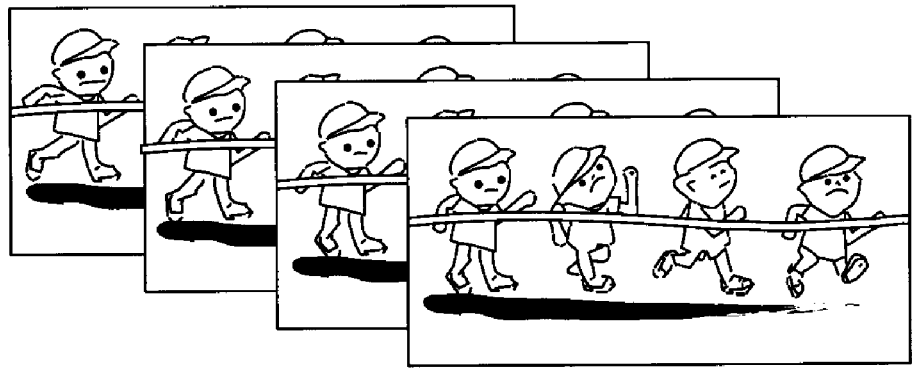
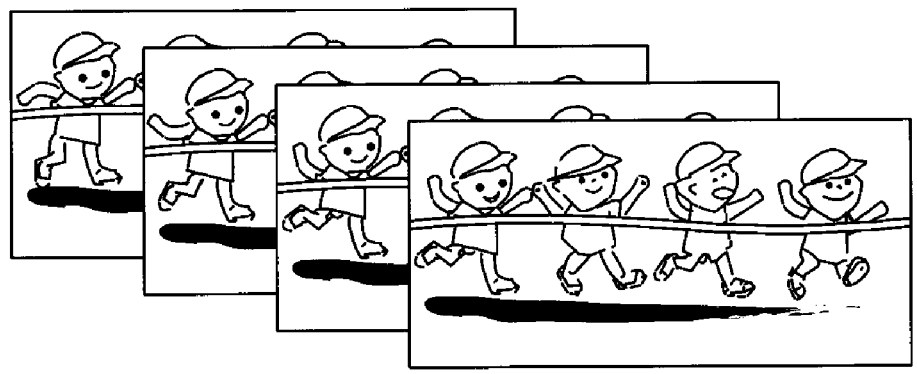
FIG. 8
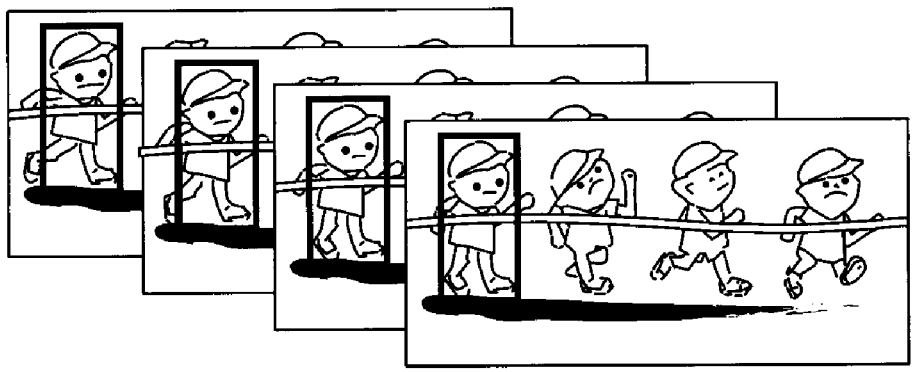
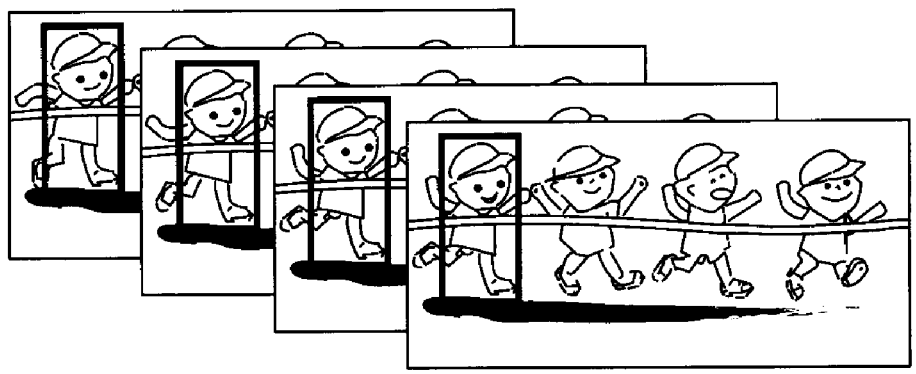

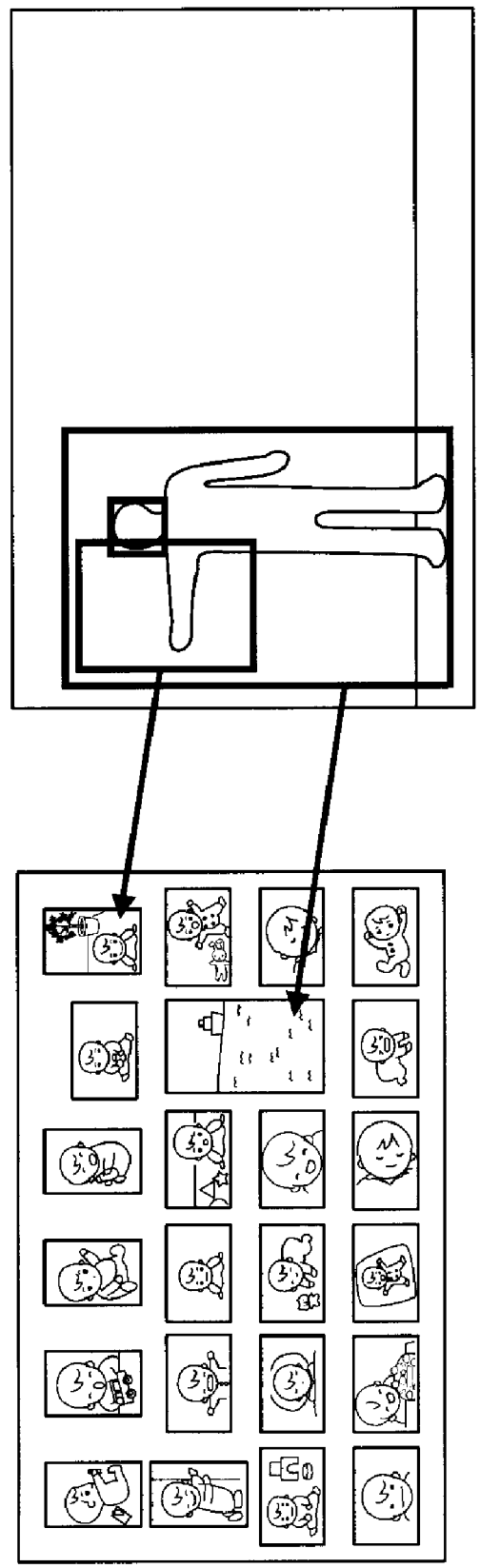

REGION DETECTION DEVICE, REGION DETECTION METHOD, IMAGE PROCESSING APPARATUS, IMAGE PROCESSING METHOD, PROGRAM, AND RECORDING MEDIUM

CROSS-REFERENCE TO RELATED APPLICATIONS

The present application claims priority under 35 U.S.C. §119 to Japanese Patent Application No. 2014-193820, filed on Sep. 24, 2014. The above application(s) is hereby expressly incorporated by reference, in its entirety, into the present application.

BACKGROUND OF THE INVENTION

1. Field of the Invention

The present invention relates to a region detection device and a region detection method which detect, for example, the entire region of an attention person from a still image extracted from a moving image, an image processing apparatus and an image processing method which generate a composite image including, for example, the detected entire region of the attention person, and a non-transitory computer-readable recording medium storing a program.

2. Description of the Related Art

In recent years, many families have captured moving images. A captured moving image is likely to include the best shot scene (a scene which appropriately shows the motion of a person captured in the moving image) which (which is difficult to capture) is not captured in a still image, such as a scene captured at the moment when a child blows out candles on his or her birthday. In some cases, the moving image includes a scene in which the motion of the person is small, a scene which is of low importance, a scene which has bad composition, and a scene with low image quality.

Therefore, it takes a lot of time and effort to detect the best shot scene from the moving image and to extract the best shot scene as a still image.

There are JP2009-75802A and JP2010-109592A as the prior art documents related to the invention.

JP2009-75802A relates to a person action search device which can rapidly reproduce moving image data from a recording position where a person is recorded. JP2009-75802A discloses the following technique: when a person in a captured image is recognized, a representative image of the recognized person is extracted; and a tracking line, which is a movement locus for the period from the appearance of the virtual center of gravity of the image of the person in the captured image to the disappearance of the virtual center of gravity from the captured image, is combined with the representative image to generate a bookmark image.

JP2010-109592A relates to a technique which extracts a representative frame directly indicating an image included in moving image data from the moving image data. JP2010-109592A discloses a structure which extracts one or a plurality of representative frames that indicate content (image) in a predetermined time section of the moving image data from the section. In addition, JP2010-109592A discloses a structure which extracts, as a representative frame image, a frame image in which an evaluation value output from a face state determination unit is the maximum.

SUMMARY OF THE INVENTION

The invention has been made in order to solve the above-mentioned problems of the related art and an object of the invention is to provide a region detection device and a region detection method which can extract a still image corresponding to the best shot scene from a moving image and detect, for example, the entire region of an attention person from the extracted still image, an image processing apparatus and an image processing method which can generate a composite image including, for example, the detected entire region of the attention person, and a non-transitory computer-readable recording medium storing a program.

In order to solve the object described above, according to an aspect of the invention, there is provided a region detection device including: a still image data extraction unit that extracts a plurality of frames of still image data from moving image data; an attention person detection unit that detects an attention person, who is a person to be processed, from a plurality of still images corresponding to the plurality of frames of still image data; a movement trajectory detection unit that tracks the movement of the attention person in a moving image corresponding to the moving image data, on the basis of the detection result of the attention person in the plurality of still images, and detects a movement trajectory of the attention person; a motion analysis unit that analyzes a motion of the attention person in the moving image, on the basis of the movement trajectory of the attention person, and calculates an evaluation value for the motion of the attention person in each of the plurality of still images, on the basis of the analyzed motion of the attention person; a still image data output unit that outputs the still image data of a still image in which the evaluation value for the motion of the attention person is equal to or greater than a threshold value from the plurality of frames of still image data; a movement region detection unit that detects an attention person movement region of the moving image in the still image in which the evaluation value is equal to or greater than the threshold value, on the basis of the movement trajectory of the attention person; a face region detection unit that detects a face region of the attention person in the still image in which the evaluation value is equal to or greater than the threshold value; and a person region detection unit that detects the entire region of the attention person in the still image in which the evaluation value is equal to or greater than the threshold value, on the basis of the attention person movement region of the moving image and the face region of the attention person.

The region detection device may further include a transfer region detection unit that detects an attention person transfer region of the moving image in the still image in which the evaluation value is equal to or greater than the threshold value, on the basis of the movement trajectory of the attention person.

According to another aspect of the invention, there is provided an image processing apparatus including: the region detection device described above; a region image extraction unit that extracts at least one of an image of the face region of the attention person, an image of the attention person movement region of the moving image, an image of the entire region of the attention person, and an image of the attention person transfer region of the moving image, which respectively correspond to the face region of the attention person, the attention person movement region of the moving image, the entire region of the attention person, and the attention person transfer region of the moving image, from the still image in which the evaluation value is equal to or greater than the threshold value; and a composite image generation unit that generates a composite image including the at least one image extracted by the region image extraction unit.

In addition, in case where the transfer region detection unit detects the attention person transfer region of the moving image, the region image extraction unit may extract the image of the attention person transfer region of the moving image from the still image in which the evaluation value is equal to or greater than the threshold value, and the composite image generation unit may generate a composite image including the image of the attention person transfer region of the moving image.

In addition, in case where another image is automatically superimposed and combined with the image of the attention person transfer region of the moving image, the composite image generation unit may superimpose the image on an image of a region other than the entire region of the attention person and combine the images.

In addition, in case where another image is automatically superimposed and combined with the image of the attention person transfer region of the moving image, the composite image generation unit may change an image of a region, with which the image is superimposed and combined, from an image of a region other than the face region of the attention person and the attention person movement region of the moving image, an image of a region other than the entire region of the attention person, and an image of a region other than the attention person transfer region of the moving image, depending on the purpose of the composite image.

In addition, in case where another image is automatically superimposed and combined with the image of the attention person transfer region of the moving image, the composite image generation unit may change an image of a region, with which the image is superimposed and combined, from an image of a region other than the face region of the attention person and the attention person movement region of the moving image, an image of a region other than the entire region of the attention person, and an image of a region other than the attention person transfer region of the moving image, depending on the type of image to be superimposed and combined.

The image processing apparatus may further include: an instruction input unit that receives an instruction input by a user, wherein the composite image generation unit superimposes an image designated by the instruction on the image of the attention person transfer region of the moving image at a position designated by the instruction and combines the images.

The movement trajectory detection unit may further detect a transfer direction and a transfer speed of the attention person, and the region image extraction unit may extend an extraction range in the transfer direction of the attention person as the transfer speed of the attention person increases and extract the image of the attention person transfer region of the moving image.

In addition, the region image extraction unit may extract the image of the attention person transfer region of the moving image such that an extraction range in a direction opposite to the transfer direction of the attention person is wider than the extraction range in the transfer direction of the attention person.

In addition, the region image extraction unit may extract at least two of the image of the face region of the attention person, the image of the attention person movement region of the moving image, the image of the entire region of the attention person, and the image of the attention person transfer region of the moving image from one still image in which the evaluation value is equal to or greater than the threshold value, and the composite image generation unit may generate a composite image including the at least two images extracted by the region image extraction unit.

In addition, the composite image generation unit may perform image processing for the image extracted by the region image extraction unit and generate a composite image including the image subjected to the image processing.

In addition, in case where the attention person transfer region of the moving image is not detected by the transfer region detection unit, the region image extraction unit may extract the image of the entire region of the attention person from the still image in which the evaluation value is equal to or greater than the threshold value, and the composite image generation unit may generate a composite image including the image of the entire region of the attention person.

According to still another aspect of the invention, there is provided a region detection method including: a step of allowing a still image data extraction unit to extract a plurality of frames of still image data from moving image data; a step of allowing an attention person detection unit to detect an attention person, who is a person to be processed, from a plurality of still images corresponding to the plurality of frames of still image data; a step of allowing a movement trajectory detection unit to track the movement of the attention person in a moving image corresponding to the moving image data, on the basis of the detection result of the attention person in the plurality of still images, and to detect a movement trajectory of the attention person; a step of allowing a motion analysis unit to analyze a motion of the attention person in the moving image, on the basis of the movement trajectory of the attention person, and to calculate an evaluation value for the motion of the attention person in each of the plurality of still images, on the basis of the analyzed motion of the attention person; a step of allowing a still image data output unit to output the still image data of a still image in which the evaluation value for the motion of the attention person is equal to or greater than a threshold value among the plurality of frames of still image data; a step of allowing a movement region detection unit to detect an attention person movement region of the moving image in the still image in which the evaluation value is equal to or greater than the threshold value, on the basis of the movement trajectory of the attention person; a step of allowing a face region detection unit to detect a face region of the attention person in the still image in which the evaluation value is equal to or greater than the threshold value; and a step of allowing a person region detection unit to detect the entire region of the attention person in the still image in which the evaluation value is equal to or greater than the threshold value, on the basis of the attention person movement region of the moving image and the face region of the attention person.

The region detection method may further include a step of allowing a transfer region detection unit to detect an attention person transfer region of the moving image in the still image in which the evaluation value is equal to or greater than the threshold value, on the basis of the movement trajectory of the attention person.

According to still another aspect of the invention, there is provided an image processing method including: a step of extracting the face region of the attention person, the attention person movement region of the moving image, the entire region of the attention person, and the attention person transfer region of the moving image using the region detection method described above, a step of allowing a region image extraction unit to extract at least one of an image of the face region of the attention person, an image of the attention person movement region of the moving image, an image of the entire region of the attention person, and an image of the attention person transfer region of the moving image, which respectively correspond to the face region of the attention person, the attention person movement region of the moving image, the entire region of the attention person, and the attention person transfer region of the moving image, from the still image in which the evaluation value is equal to or greater than the threshold value; and a step of allowing a composite image generation unit to generate a composite image including the at least one image extracted by the region image extraction unit.

The invention provides a program that causes a computer to perform each step of the above-mentioned region detection method.

The invention provides a computer-readable recording medium storing a program that causes a computer to perform each step of the above-mentioned region detection method.

The invention provides a program that causes a computer to perform each step of the above-mentioned image processing method.

The invention provides a computer-readable recording medium storing a program that causes a computer to perform each step of the above-mentioned image processing method.

According to the invention, it is possible to automatically detect a still image having an evaluation value equal to or greater than the threshold value from the moving image, on the basis of the evaluation value for the motion of the attention person in the moving image.

According to the invention, it is possible to detect, for example, the face region of the attention person, the attention person movement region of the moving image, the entire region of the attention person, and the attention person transfer region of the moving image from the still image having an evaluation value equal to or greater than the threshold value.

According to the invention, it is possible to generate a composite image including at least one of the image of the face region of the attention person, the image of the attention person movement region of the moving image, the image of the entire region of the attention person, and the image of the attention person transfer region of the moving image in the still image having an evaluation value equal to or greater than the threshold value.

BRIEF DESCRIPTION OF THE DRAWINGS

FIG. 6 is a flowchart illustrating an example of the operation of the still image extraction unit illustrated in FIG. 3.

FIG. 7 is a conceptual diagram illustrating an example in which all still image frames are extracted from a moving image.

FIG. 8 is a conceptual diagram illustrating an example in which the region of a person detected from each of the still image frames illustrated in FIG. 7 is surrounded by a frame.

FIG. 19 is a conceptual diagram illustrating an example in which a composite image including the image of two regions extracted from one still image is generated.

DESCRIPTION OF THE PREFERRED EMBODIMENTS

Hereinafter, a region detection device, a region detection method, an image processing apparatus, an image processing method, a program, and a non-transitory computer-readable recording medium storing the program according to the invention will be described in detail on the basis of preferred embodiments illustrated in the accompanying drawings.

Figure 1:
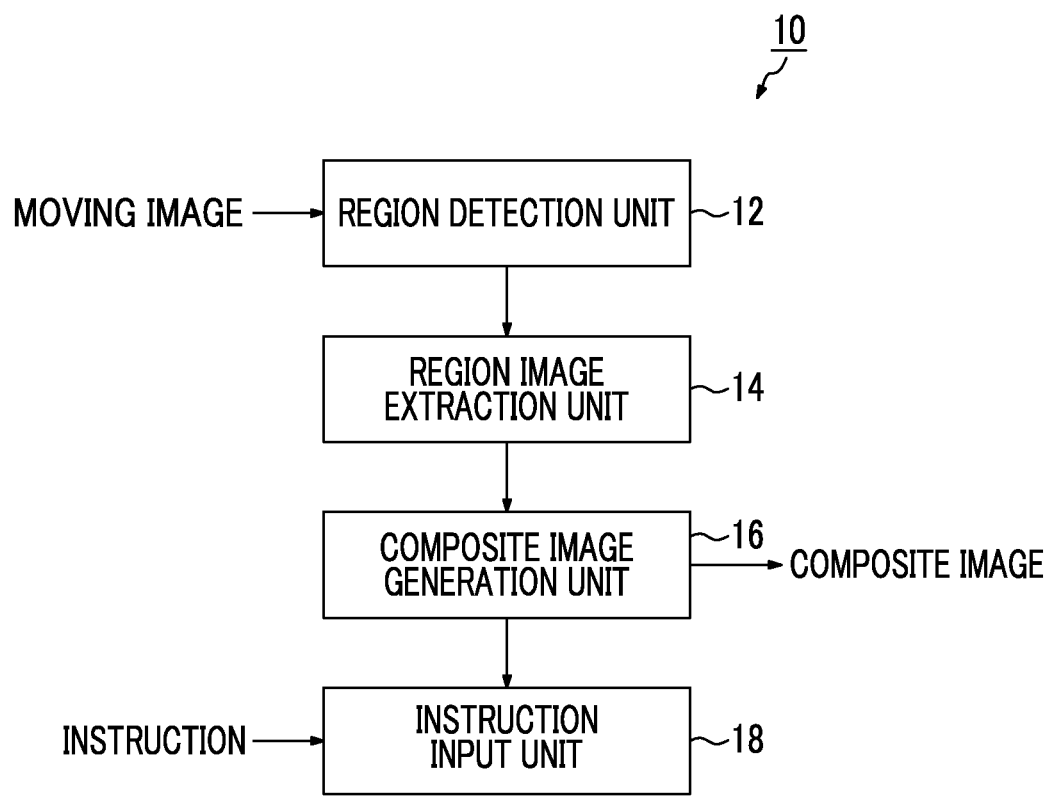
FIG. 1 is a block diagram illustrating an embodiment of the structure of an image processing apparatus according to the invention.

FIG. 1 is a block diagram illustrating the structure of an image processing apparatus according to an embodiment of the invention. An image processing apparatus 10 automatically extracts a still image having an evaluation value equal to or greater than a threshold value from a plurality of still images extracted from a moving image, detects, for example, the entire region of an attention person in the extracted still image, and generates a composite image including an image of, for example, the detected entire region of the attention person. The image processing apparatus 10 includes a region detection unit 12, a region image extraction unit 14, a composite image generation unit 16, and an instruction input unit 18. The instruction input unit 18 is an input device, such as a mouse, a keyboard, or a touch sensor. For example, one or a plurality of control devices, such as CPUs, execute a program loaded to a memory to implement the functions of the region detection unit 12, the region image extraction unit 14, and the composite image generation unit 16.

A moving image which is captured by, for example, a video camera or a smart phone is input to the region detection unit 12. The region detection unit 12 outputs a still image having an evaluation value equal to or greater than the threshold value among a plurality of still images extracted from the moving image and detects, for example, a face region of an attention person, an attention person movement region of the moving image (a region in which the attention person moves in the moving image), the entire region of the attention person (a region including the entire body of the attention person), and an attention person transfer region of the moving image (a region in which the attention person transfers in the moving image) in the still image having the evaluation value equal to or greater than the threshold value. The region detection unit 12 will be described in detail below.

The region image extraction unit 14 extracts at least one of an image of the face region of the attention person, an image of the attention person movement region of the moving image, an image of the entire region of the attention person, and an image of the attention person transfer region of the moving image, which respectively correspond to the face region of the attention person, the attention person movement region of the moving image, the entire region of the attention person, and the attention person transfer region of the moving image that are output from the region detection unit 12, from the still image having the evaluation value equal to or greater than the threshold value.

The composite image generation unit 16 generates a composite image including the at least one image extracted by the region image extraction unit 14.

The composite image generation unit 16 can generate, for example, a photo book including the image of the entire region of the attention person.

The instruction input unit 18 receives various instructions input by the user.

In this embodiment, in case where the user manually superimposes an image on the image of the attention person transfer region of the moving image to compose the images, for example, an instruction to designate the image to be superimposed or a superimposition position is input through the instruction input unit 18.

Next, the region detection unit 12 will be described.

Figure 2:
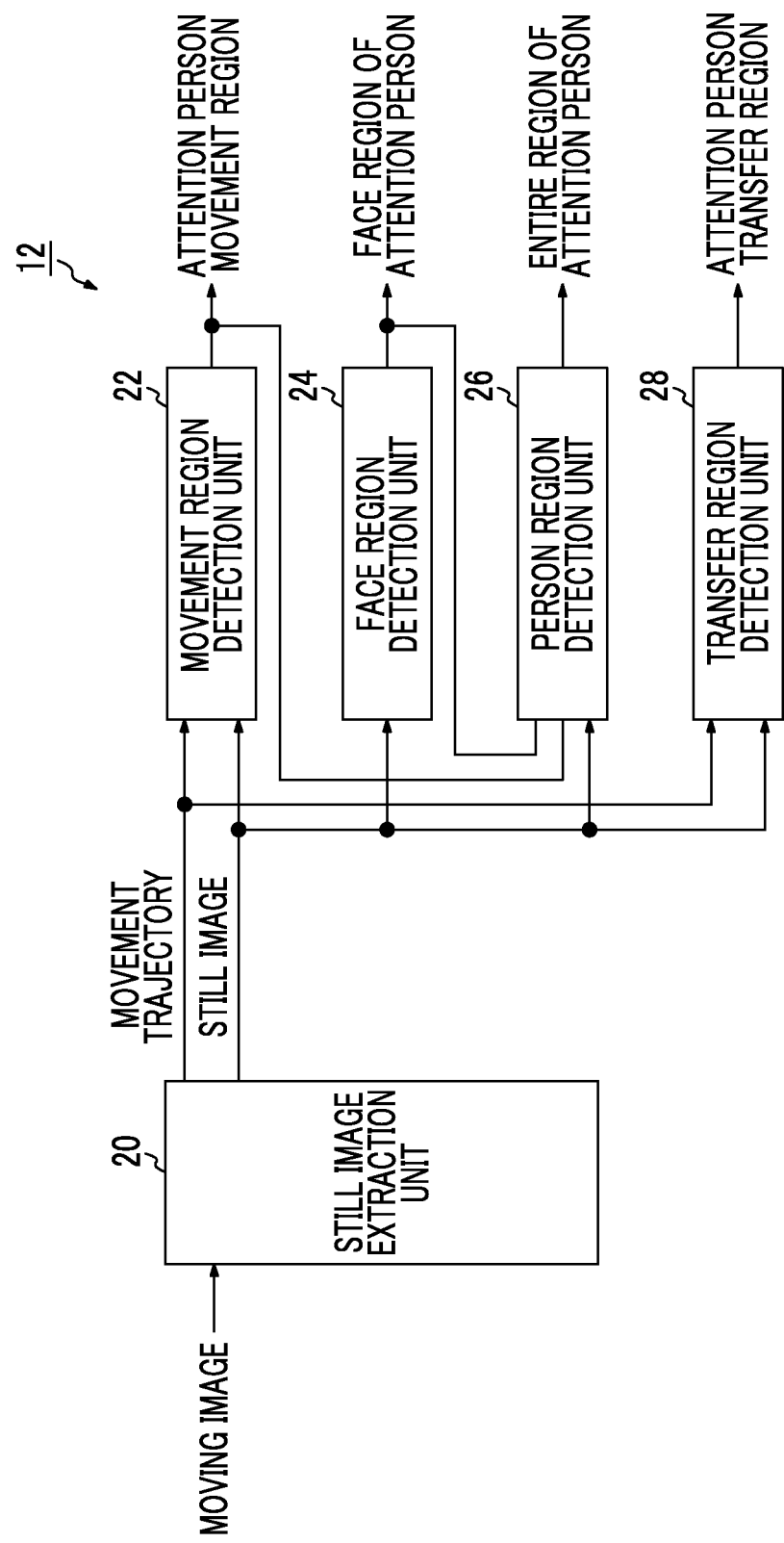
FIG. 2 is a block diagram illustrating an embodiment of the structure of a region detection unit illustrated in FIG. 1.

FIG. 2 is a block diagram illustrating an embodiment of the structure of the region detection unit illustrated in FIG. 1. The region detection unit 12 illustrated in FIG. 2 is an example of a region detection device according to the invention and includes a still image extraction unit 20, a movement region detection unit 22, a face region detection unit 24, a person region detection unit 26, and a transfer region detection unit 28. For example, one or a plurality of control devices, such as CPUs, execute the program loaded to the memory to implement the functions of these components.

The still image extraction unit 20 extracts a plurality of still images from a moving image and automatically extracts a still image having an evaluation value equal to or greater than the threshold value from the plurality of extracted still images, that is, a still image corresponding to the best shot scene. In addition, the still image extraction unit 20 detects, for example, the movement trajectory of the attention person in the moving image.

The still image extraction unit 20 will be described in detail below.

The movement region detection unit 22 detects the attention person movement region of the moving image in the still image having the evaluation value equal to or greater than the threshold value, on the basis of the movement trajectory of the attention person detected by the still image extraction unit 20.

The face region detection unit 24 detects the face region of the attention person in the still image having the evaluation value equal to or greater than the threshold value.

The face region of the attention person can be detected by various methods including the known methods according to the related art.

The person region detection unit 26 detects the entire region of the attention person in the still image having the evaluation value equal to or greater than the threshold value, on the basis of the attention person movement region of the moving image detected by the movement region detection unit 22 and the face region of the attention person detected by the face region detection unit 24.

The transfer region detection unit 28 detects the attention person transfer region of the moving image in the still image having the evaluation value equal to or greater than the threshold value, on the basis of the movement trajectory of the attention person detected by the still image extraction unit 20.

Next, the still image extraction unit 20 will be described.

Figure 3:
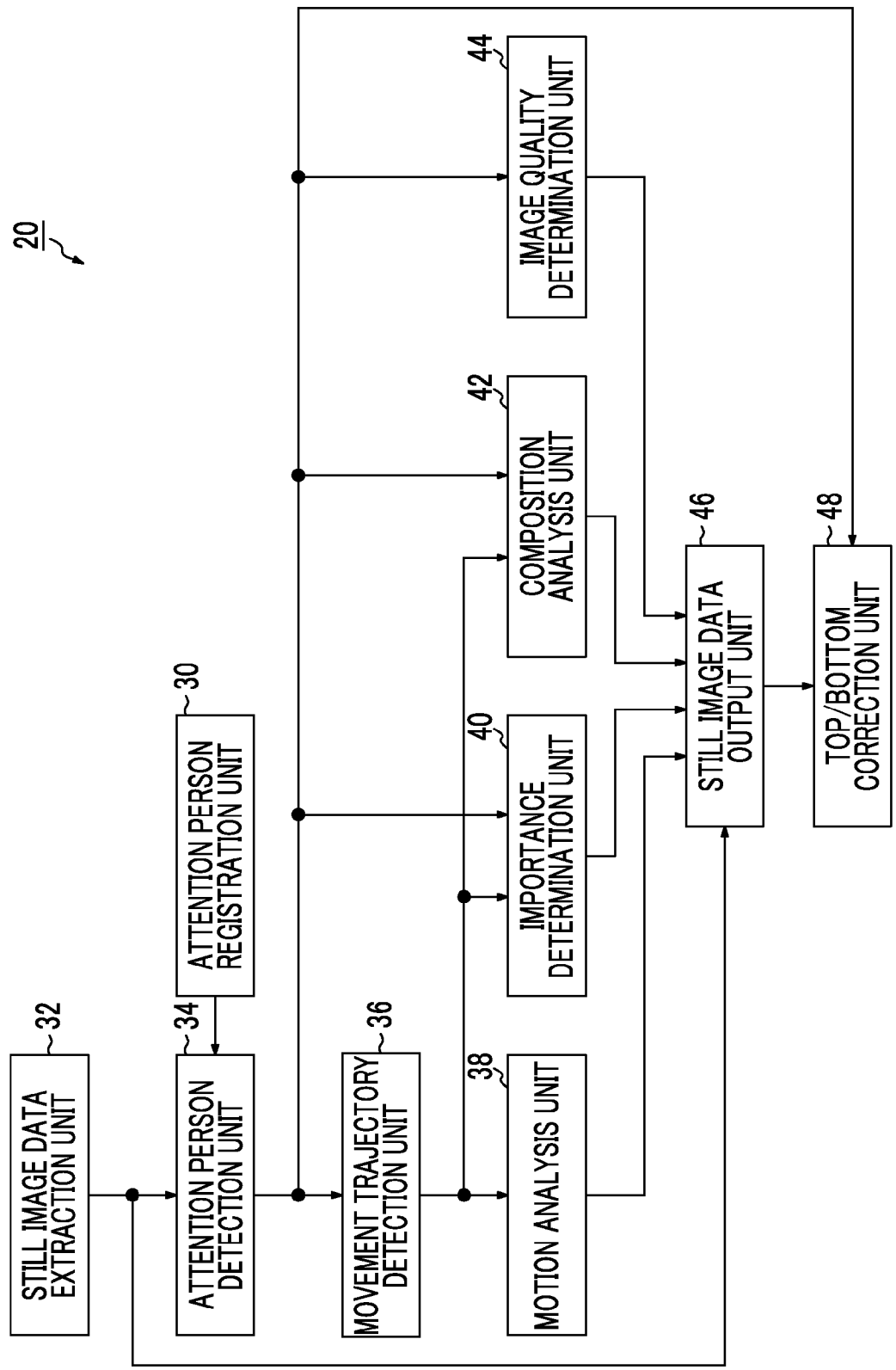
FIG. 3 is a block diagram illustrating an embodiment of the structure of a still image extraction unit illustrated in FIG. 2.

FIG. 3 is a block diagram illustrating an embodiment of the structure of the still image extraction unit illustrated in FIG. 2. The still image extraction unit 20 illustrated in FIG. 3 extracts still image data for the still image corresponding to the best shot scene from moving image data. The still image extraction unit 20 includes an attention person registration unit 30, a still image data extraction unit 32, an attention person detection unit 34, a movement trajectory detection unit 36, a motion analysis unit 38, an importance determination unit 40, a composition analysis unit 42, an image quality determination unit 44, a still image data output unit 46, and a top/bottom correction unit 48. For example, one or a plurality of control devices, such as CPUs, execute the program loaded to the memory to implement the functions of these components.

The attention person registration unit 30 registers, as a registration person, an attention person to be processed among the persons in the moving image corresponding to the moving image data.

For example, the attention person registration unit 30 can register, as the registration person, a person who is designated by the user among the persons in the moving image. In addition, the attention person registration unit 30 can register the image of the registration person (for example, a face image for specifying the attention person).

Then, the still image data extraction unit 32 extracts a plurality of frames of still image data from the moving image data.

For example, the still image data extraction unit 32 can extract all frames (each frame) of still image data from the moving image data. However, the invention is not limited thereto. The still image data extraction unit 32 may extract one frame of still image data from a predetermined number of frames, for example, two frames. The still image data extraction unit 32 may extract only frames of still image data in an arbitrary section of the moving image corresponding to the moving image data.

Then, the attention person detection unit 34 detects the attention person, who is the person to be processed, from each of a plurality of still images corresponding to a plurality of frames of still image data which are extracted from the moving image data by the still image data extraction unit 32.

For example, the attention person detection unit 34 detects whether there is a person in each of the plurality of still images and compares the images of the detected persons with, for example, the image of the registration person registered in the attention person registration unit 30 (compares, for example, the face images) to specify, as the attention person, a person (a person having a similarity equal to or greater than a threshold value) who is identical or similar to the registration person among the detected persons.

Alternatively, the attention person detection unit 34 extracts the faces of the persons from each of the plurality of still images and determines a central person in the images of the extracted faces of the persons to specify, as the attention person, the person who has been determined to be the central person by the determination of the central person among the persons whose faces have been extracted.

In the determination of the central person, for example, a process of determining the same person is performed for a plurality of face images and the plurality of face images are separated into image groups including the face images of the same persons. Then, one or more persons among the persons belonging to the image group are determined to be the main character and one or more persons who are highly relevant to the main character among the persons other than the main character are determined to be important persons.

It is possible to specify the persons corresponding to each image group on the basis of the face image of each registration person registered in the attention person registration unit 30.

For example, a person whose face image is detected the largest number of times may be determined to be the main character, or a person who appears the largest number of times together with the main character in the still images, among the persons other than the main character, may be determined to be an important person.

In addition, the distances between the face image of the main character and the face images of the persons other than the main character in the same still image may be calculated and a person whose face image is closest to the face image of the main character may be determined to be an important person.

The important person may be determined on the basis of a difference between information about the imaging date and time of a still image including the main character and information about the imaging date and time of a still image including the persons other than the main character and/or a difference between information about the imaging position of the still image including the main character and information about the imaging position of the still image including the persons other than the main character.

The attention person detection unit 34 can detect, for example, the position of the attention person, the size of the attention person, the entire region of the attention person, an upper half region of the attention person, the position of the face of the attention person, the size of the face of the attention person, a face region of the attention person, and the direction of the face of the attention person in the still image.

Since the attention person and the face of the attention person in the still image can be detected by a known method, the description thereof will not be repeated in this embodiment. However, the detailed method for detecting the face of the attention person is not particularly limited. In addition, the method for detecting the attention person is not particularly limited.

Then, the movement trajectory detection unit 36 tracks the movement of the attention person in the moving image corresponding to the moving image data and detects the movement trajectory of the attention person, on the basis of the detection result of the attention person in a plurality of still images by the attention person detection unit 34. In addition, the movement trajectory detection unit 36 detects the movement trajectory of the attention person to detect, for example, the length of the movement trajectory of the attention person or the transfer pattern of the attention person.

Figure 4A:
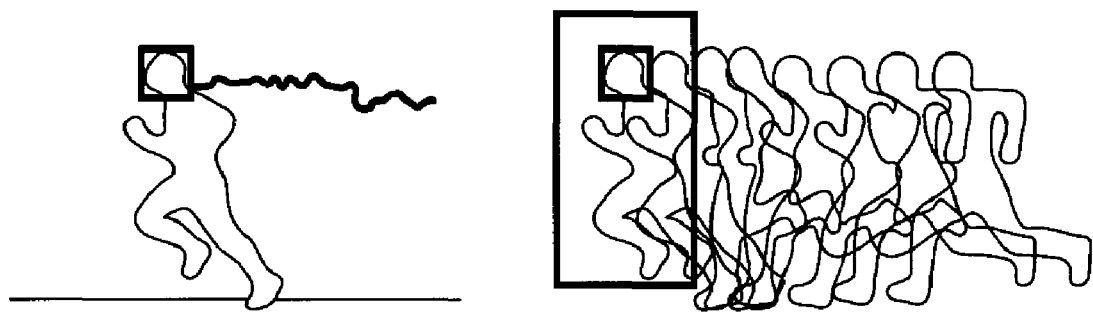
FIGS. 4A to 4C are conceptual diagrams in which an example of a movement trajectory of an attention person is illustrated on the left side and an example of a motion history image of the attention person is illustrated on the right side.
Figure 4B:
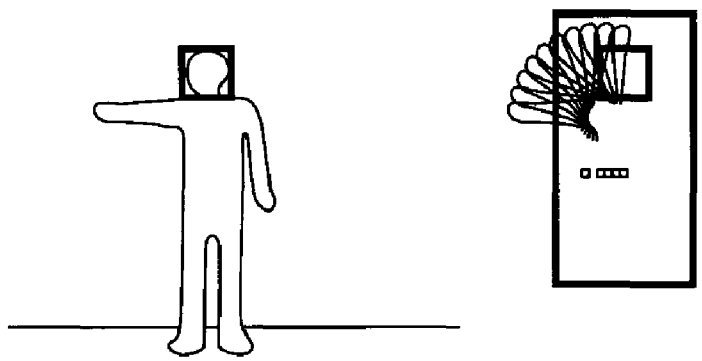
Figure 4C:
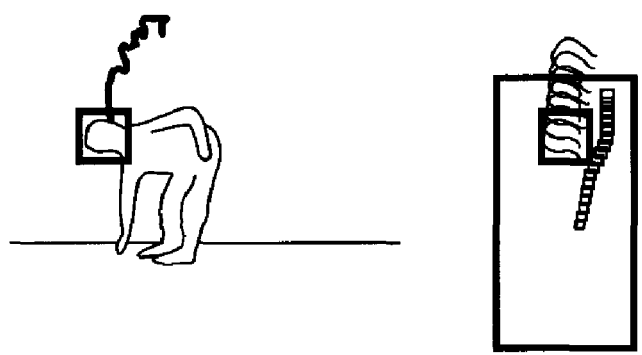

Here, the linear movement trajectory of a region of interest (ROI), for example, the face region of the attention person illustrated on the left side of FIGS. 4A to 4C can be used as the movement trajectory of the attention person. In addition, a motion history image (MHI) illustrated on the right side of FIGS. 4A to 4C may be used as the movement trajectory of the attention person. The motion history image is an image in which a color indicating the history of the motion of the attention person is changed, for example, at a predetermined time interval. The use of the motion history image enables the user to know the position of the attention person, the size of the attention person, the transfer position of the attention person, and the transfer direction of the attention person in the motion history image.

The movement trajectory detection unit 36 compares the face region of the attention person in the current still image frame with a detection region at an arbitrary position corresponding to the face region of the attention person in the next still image frame, on the basis of, for example, the face region of the attention person, and detects which detection region of the next still image frame the face region of the attention person in the current still image frame is moved to, on the basis of the position of the detection region in the next still image frame where the similarity of the detection region to the face region of the attention person in the current still image frame is equal to or greater than a threshold value. In this way, the movement trajectory detection unit 36 can track the movement of the attention person in the moving image.

In some cases, only the detection of the face region of the attention person is insufficient to track the movement of the attention person since, for example, the position of the attention person or the size of the attention person in the still image varies over time. In this case, in addition to the face region of the attention person, the upper half region of the attention person is divided into a predetermined number of regions, for example, four regions. Then, similarly, the movement tracking of the attention person is performed for a total of five regions, that is, the face region and the four regions divided from the upper half region. Therefore, it is possible to improve the success rate of tracking.

In case where the similarity between the face region of the attention person in the current still image frame and the detection region in the next still image frame is calculated, a process of calculating the sum of the brightness values of all pixels included in the detection region at an arbitrary position needs to be sequentially repeated for the detection regions at a plurality of positions in order to detect the detection region at a position, which corresponds to the face region of the attention person in the current still image frame, in the next still image frame. Therefore, the amount of calculation for the sum of the brightness values in each frame increases significantly.

In this case, an integral image of the next still image frame (that is, each frame) is generated and the sum of the brightness values is calculated using the generated integral image. In this way, the amount of calculation is reduced and it is possible to improve a processing speed. The integral image is an image in which, for example, when the coordinate values of the pixels in the still image increase from the left to the right and from the top to the bottom of the still image, the pixels at each coordinate have the integral value of the brightness values from the upper left pixel to the pixel at each coordinate.

A method has been known which calculates the sum of the brightness values of all of the pixels in a region corresponding to the face region of the attention person, using the integral image. Therefore, in this embodiment, the detailed description thereof will not be repeated. In addition, in case where the movement of the attention person is tracked, various methods including, for example, a mean shift method can be used in order to reduce the amount of calculation or to increase the processing speed, in addition to the method using the integral image. Since the mean shift method has also been known, the detailed description thereof will not be repeated.

Then, the motion analysis unit 38 analyzes the motion of the attention person in the moving image, on the basis of the movement trajectory of the attention person detected by the movement trajectory detection unit 36, for example, the movement trajectory of the region of interest, such as the face region, and calculates an evaluation value for the motion of the attention person in each of a plurality of still images, on the basis of the analyzed motion of the attention person.

For example, the motion analysis unit 38 defines in advance a movement trajectory for the motion of the attention person, for example, a movement trajectory when the attention person is running. Then, the motion analysis unit 38 detects a portion similarly to the defined movement trajectory from the movement trajectory of the attention person detected by the movement trajectory detection unit 36 and analyzes the motion of the attention person. In addition, in case where the motion of the attention person is running, the motion analysis unit 38 can calculate some evaluation values for the motion of the attention person according to the type of motion of the attention person.

The motion analysis unit 38 analyzes the motion of the attention person, on the basis of the motion history images illustrated on the right side of FIGS. 4A to 4C as the movement trajectory of the attention person, to calculate the evaluation value for the motion of the attention person.

The motion analysis unit 38 analyzes the motion of the attention person on the basis of the motion history image to recognize that the attention person is running from the right to the left of FIG. 4A, as illustrated on the right side of FIG. 4A. In addition, as illustrated on the right side of FIG. 4B, the motion analysis unit 38 can recognize that the attention person stands still while moving only the right hand. As illustrated on the right side of FIG. 4C, the motion analysis unit 38 can recognize that the attention person picks up something on the ground. In addition, it is possible to calculate the evaluation value for the motion of the attention person, on the basis of, for example, whether the attention person is moving, the position of the attention person, and the transfer direction of the attention person.

Then, the importance determination unit 40 determines the importance of each of the plurality of still images, on the basis of at least one of the length of the movement trajectory of the attention person, the position of the attention person in the still image, and the size of the attention person in the still image, and calculates the evaluation value of the importance of each of the plurality of still images, on the basis of the determined importance.

For example, in case where the length of the movement trajectory of the attention person is large (in case where the length is equal to or greater than a threshold value), it can be supposed that the degree of interest of the photographer in the attention person is high. Therefore, the importance determination unit 40 determines that the importance of a still image corresponding to a scene in which the length of the movement trajectory of the attention person is large in the moving image is high. In addition, the importance determination unit 40 determines that the importance of the still image in which the attention person is arranged at the center or the still image in which the size of the attention person is large (the size of the attention person is equal to or greater than a threshold value) is high. Therefore, as the importance increases, the calculated evaluation value of the importance increases.

Then, the composition analysis unit 42 analyzes whether the composition of each of the plurality of still images is good or bad, on the basis of at least one of the position of the attention person in the still image, the size of the attention person in the still image, and the transfer pattern of the attention person, and calculates the evaluation value of the composition of each of the plurality of still images on the basis of the analysis result of the composition.

For example, the composition analysis unit 42 analyzes that the composition of the still image in which the attention person is arranged at the center is better than that of the still image in which the attention person is not arranged at the center and the composition of the still image in which the size of the attention person is large (the size of the attention person is equal to or greater than the threshold value) is better than that of the still image in which the size of the attention person is not large. Then, the composition analysis unit 42 can calculate the evaluation value of the composition such that the evaluation value of the good composition of the still image is greater than the evaluation value of the bad composition of the still image.

The composition analysis unit 42 defines in advance the transfer pattern of the attention person, for example, a transfer pattern in which the attention person transfers from the left end to the right end of the moving image. Then, the composition analysis unit 42 detects a portion in which the attention person is transferring in the defined transfer pattern from the movement trajectory of the attention person detected by the movement trajectory detection unit 36. Then, the composition analysis unit 42 analyzes that the composition of a still image corresponding to the portion in which the attention person is transferring in the defined transfer pattern is good and can calculate the evaluation value of the composition such that the evaluation value of the good composition of the still image is greater than the evaluation value of the bad composition of the still image.

Then, the image quality determination unit 44 determines the quality of each of a plurality of still images on the basis of the region of the attention person in the still image, for example, the region of interest such as the face region, and calculates the evaluation value of the quality of each of the plurality of still images, on the basis of the determined image quality.

The quality of the still image extracted from the moving image varies depending on a moving image data compression method. In addition, in some cases, blurring or shaking occurs in the still image due to, for example, defocus or camera shake and the brightness, tone, and contrast of the still image are inappropriate. However, for example, in case where the image quality of the face region or the body region of the attention person, which is the region of interest, is high even though the image quality of the background is low, the image quality determination unit 44 determines that the quality of the still image is high. As the quality of the still image increases, the calculated evaluation value of the quality of the still image which has been determined to have high quality can increase.

Then, the still image data output unit 46 outputs the data of the still image, in which the evaluation value for the motion of the attention person or the sum of the evaluation value for the motion of the attention person and at least one of the evaluation value of the importance, the evaluation value of composition, and the evaluation value of image quality is equal to or greater than a threshold value, as the data of the still image corresponding to the best shot scene from a plurality of frames of still image data which are extracted from the moving image data by the still image data extraction unit 32.

Finally, the top/bottom correction unit 48 corrects the top and bottom of the still image corresponding to the still image data output from the still image data output unit 46, on the basis of the direction of the face of the attention person detected by the attention person detection unit 34, such that the top and bottom of the still image corresponding to the still image data which is output from the still image data output unit 46 are aligned with the top and bottom of the imaging device when the moving image is captured.

Figure 5A:
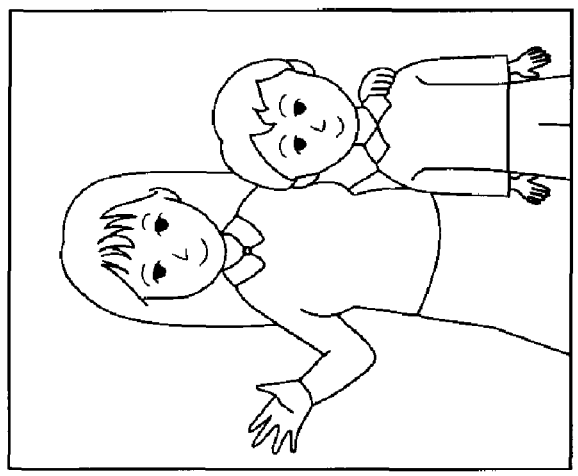
FIG. 5A is a conceptual diagram illustrating an example of a still image which is rotated 90° in a counterclockwise direction.
Figure 5B:
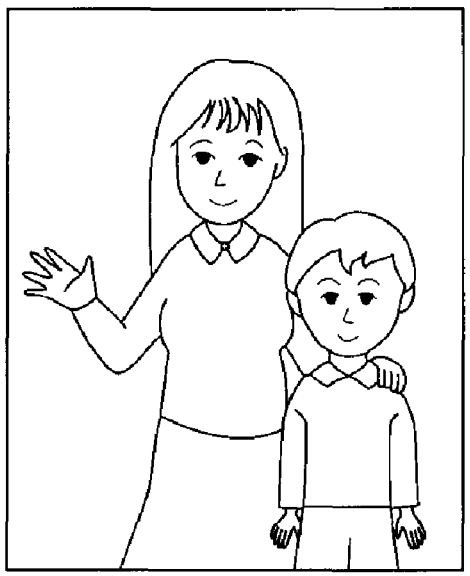
FIG. 5B is a conceptual diagram illustrating an example of a still image obtained by rotating the still image illustrated in FIG. 5A 90° in a clockwise direction to correct the top and bottom thereof.

FIG. 5A is a conceptual diagram illustrating an example of a still image which is rotated 90° in the counterclockwise direction. The still image is obtained by rotating the imaging device 90° in the clockwise direction when the moving image is captured. The top/bottom correction unit 48 rotates the still image illustrated in FIG. 5A 90° in the clockwise direction such that the top and bottom of the still image are aligned with the top and bottom of the imaging device when the moving image is captured, thereby correcting the top and bottom of the still image as illustrated in FIG. 5B.

In case where two or more persons are registered in the attention person registration unit 30, the attention person detection unit 34 can detect each of two or more attention persons from a plurality of still images and sequentially specify who the detected attention persons are. In this case, the movement trajectory detection unit 36, the motion analysis unit 38, the importance determination unit 40, the composition analysis unit 42, the image quality determination unit 44, the still image data output unit 46, and the top/bottom correction unit 48 sequentially perform the processes for each of the two or more attention persons.

Next, the operation of the still image extraction unit 20 illustrated in FIG. 3 will be described with reference to the flowchart illustrated in FIG. 6.

As illustrated in the flowchart of FIG. 6, first, the attention person registration unit 30 registers, as the attention person, for example, a person designated by the user among the persons in the moving image (Step S1).

Then, the still image data extraction unit 32 extracts, for example, all frames of still image data from the moving image data (Step S2). That is, as illustrated in FIG. 7, all still image frames are extracted from the moving image.

After the still image data is extracted from the moving image data, the attention person may be registered.

Then, the attention person detection unit 34 detects the attention person registered in the attention person registration unit 30 from each still image frame extracted by the still image data extraction unit 32 (Step S3). In this way, the attention person is specified in each still image frame. In addition, as represented by a frame in FIG. 8, for example, the position of the attention person, the size of the attention person, and the region of the attention person are detected in each still image frame.

Then, the movement trajectory detection unit 36 tracks the movement of the attention person in the moving image, for example, the movement of the region of interest which is represented by the frame in FIG. 8, on the basis of the detection result of the attention person in each still image frame, and detects the movement trajectory of the attention person (Step S4). Therefore, for example, as illustrated on the left side of FIGS. 4A to 4C, the linear movement trajectory of the region of interest, such as the face region, can be obtained as the movement trajectory of the attention person or the motion history image illustrated on the right side of FIGS. 4A to 4C can be obtained as the movement trajectory of the attention person.

Then, the motion analysis unit 38 analyzes the motion of the attention person in the moving image on the basis of the movement trajectory of the attention person detected by the movement trajectory detection unit 36. Then, the motion analysis unit 38 calculates the evaluation value for the motion of the attention person in each still image frame, on the basis of the analyzed motion of the attention person (Step S5-1).

The importance determination unit 40 determines the importance of each still image on the basis of the length of the movement trajectory of the attention person, the position of the attention person in the still image, and the size of the attention person. Then, the importance determination unit 40 calculates the evaluation value of the importance of each still image frame, on the basis of the determined importance (Step S5-2).

The composition analysis unit 42 analyzes whether the composition of each still image is good or bad, on the basis of the position of the attention person in the still image, the size of the attention person, and the transfer pattern of the attention person. Then, the composition analysis unit 42 calculates the evaluation value of the composition of each still image frame, on the basis of the analysis result of the composition (Step S5-3).

The image quality determination unit 44 determines the quality of each still image frame on the basis of the region of the attention person in the still image. Then, the image quality determination unit 44 calculates the evaluation value of the quality of each still image on the basis of the determined image quality, such as the degree of shaking and blurring in this embodiment (Step S5-4).

For example, it is determined whether shaking and blurring occurs in the region of interest represented by a frame in FIG. 5. As the degree of shaking and blurring increases, the calculated evaluation value of the image quality decreases.

The order in which the evaluation value of the motion of the attention person, the evaluation value of the importance, the evaluation value of the composition, and the evaluation value of the image quality are calculated is not particularly limited. The evaluation values can be calculated in any order. The evaluation values may be calculated in parallel. That is, the evaluation values may be calculated at the same time.

Figure 9:
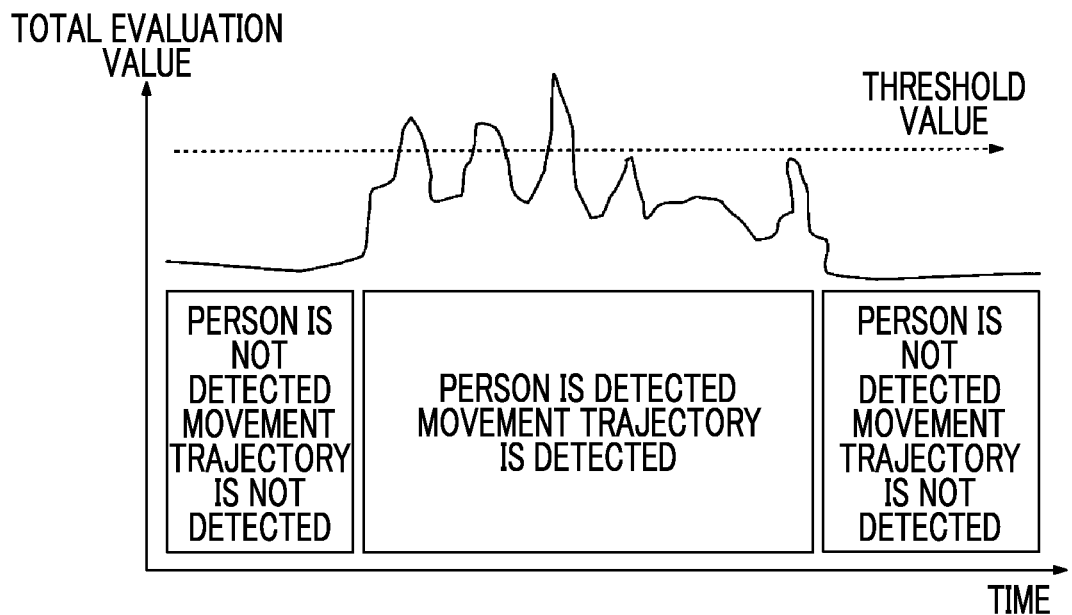
FIG. 9 is a graph illustrating an example of the total evaluation values of all the still image frames extracted from the moving image.

Then, the still image data output unit 46 outputs the data of one or more still images, in which the sum of the evaluation value of the motion of the attention person, the evaluation value of importance, the evaluation value of composition, and the evaluation value of image quality (for example, the added value of the evaluation values) is equal to or greater than a threshold value, as the data of the still image corresponding to the best shot scene from all of the frames of still image data which are extracted from the moving image data by the still image data extraction unit 32, as illustrated in FIG. 9 (Step S6).

Figure 10:
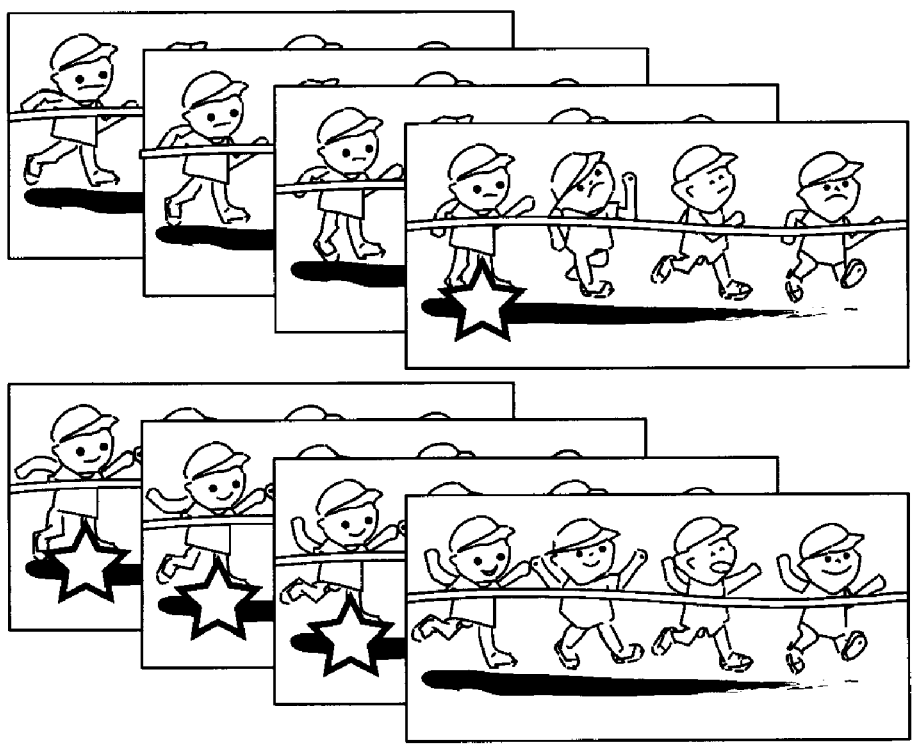
FIG. 10 is a conceptual diagram illustrating an example in which a still image that has a total evaluation value equal to or greater than a threshold value among all of the still image frames illustrated in FIG. 7 is marked with an asterisk.

FIG. 9 is a graph illustrating an example of the total evaluation values of all the still image frames extracted from the moving image. In FIG. 9, the vertical axis indicates the total evaluation value of each still image and the horizontal axis indicates time (frame). As illustrated in FIG. 9, the data of the still image which has a total evaluation value equal to or greater than the threshold value, as represented by an asterisk in FIG. 10, is output from the still images from which the attention person is detected by the attention person detection unit 34 and from which the movement trajectory of the attention person is detected by the movement trajectory detection unit 36 among all of the still images.

Finally, the top/bottom correction unit 48 corrects the top and bottom of the still image, on the basis of the direction of the face of the attention person detected by the attention person detection unit 34, such that the top and bottom of the still image are aligned with the top and bottom of the imaging device when the moving image is captured (Step S7).

As described above, the still image extraction unit 20 can automatically detect the best shot scene from the moving image, on the basis of, for example, the evaluation value for the motion of the attention person in the moving image, or the total evaluation value including the evaluation value for the motion of the attention person in the moving image, the evaluation value of the importance of the still image, the evaluation value of composition, and the evaluation value of image quality, and can extract the data of a still image corresponding to the best shot scene from all frames of still image data extracted from the moving image data.

Figure 11:
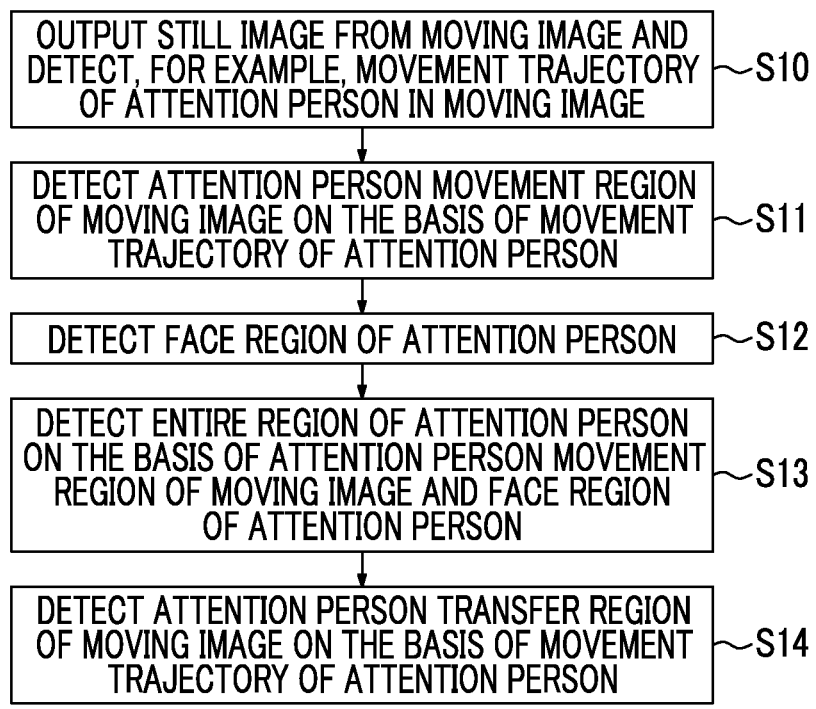
FIG. 11 is a flowchart illustrating an example of the operation of the region detection unit illustrated in FIG. 2.

Next, the operation of the region detection unit 12 will be described with reference to the flowchart illustrated in FIG. 11.

In the region detection unit 12, as described above, the still image extraction unit 20 outputs the still image having an evaluation value equal to or greater than the threshold value among a plurality of still images extracted from the moving image and detects the movement trajectory of the attention person in the moving image (Step S10).

Then, the movement region detection unit 22 detects the attention person movement region of the moving image in the still image having the evaluation value equal to or greater than the threshold value, on the basis of the movement trajectory of the attention person (Step S11).

Figure 13:
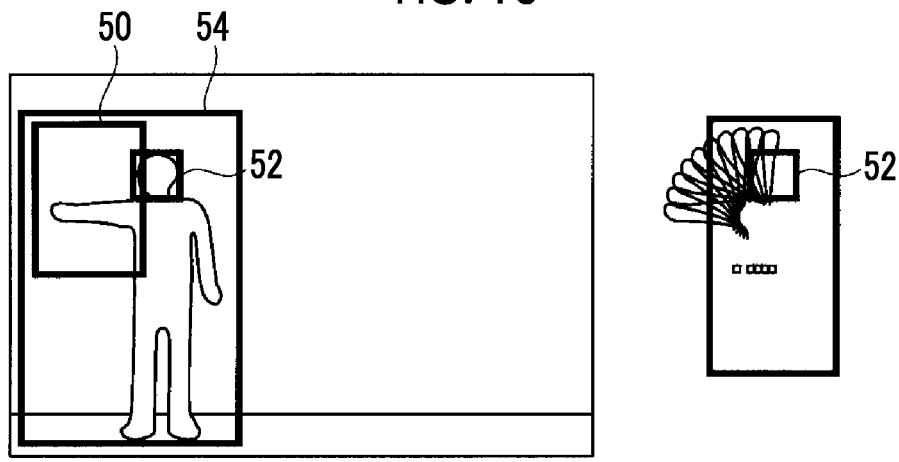
FIG. 13 is a conceptual diagram illustrating a face region of the attention person, an attention person movement region of the moving image, and the entire region of the attention person in the conceptual diagram illustrated in FIG. 4B.

FIG. 13 is a conceptual diagram illustrating the face region of the attention person, the attention person movement region of the moving image, and the entire region of the attention person in the conceptual diagram illustrated in FIG. 4B. FIG. 13 illustrates an example of the still image in which the attention person stands still while moving only the right hand, as described above. In this case, a region (rectangular region) of the moving image in which the right hand of the attention person moves is detected as an attention person movement region 50 of the moving image.

Figure 14:
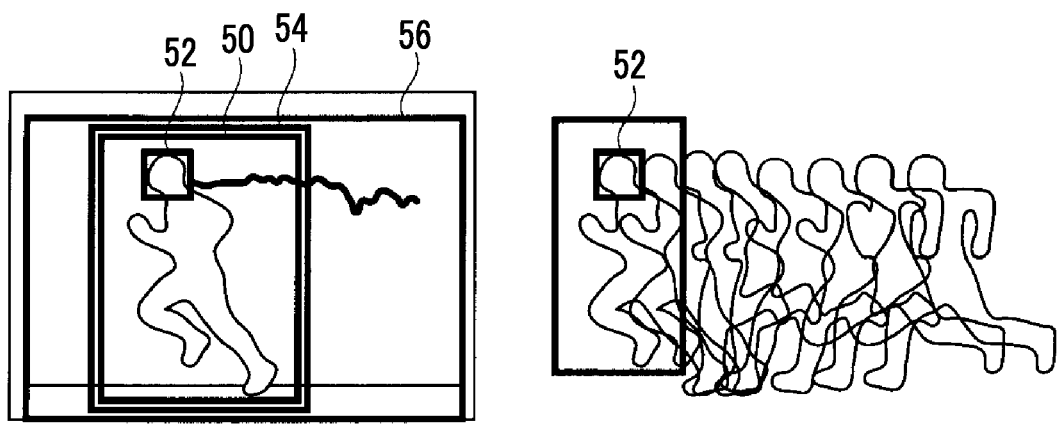
FIG. 14 is a conceptual diagram illustrating the face region of the attention person, the attention person movement region of the moving image, the entire region of the attention person, and an attention person transfer region in the conceptual diagram illustrated in FIG. 4A.

FIG. 14 is a conceptual diagram illustrating the face region of the attention person, the attention person movement region of the moving image, the entire region of the attention person, and the attention person transfer region in the conceptual diagram illustrated in FIG. 4A. FIG. 14 illustrates an example of the still image in which the attention person is running from the right to the left of FIG. 14, as described above. In this case, a region (rectangular region) of the moving image in which the entire body of the attention person is moving is detected as the attention person movement region 50 of the moving image.

As illustrated in FIGS. 13 and 14, the face region detection unit 24 detects a face region (rectangular region) 52 of the attention person in the still image having the evaluation value equal to or greater than the threshold value (Step S12).

Then, as illustrated in FIGS. 13 and 14, the person region detection unit 26 detects an entire region (rectangular region) 54 of the attention person in the still image having the evaluation value equal to or greater than the threshold value, on the basis of the attention person movement region 50 of the moving image and the face region 52 of the attention person (Step S13).

In FIG. 14, since the entire body of the attention person is moving, the attention person movement region 50 of the moving image is substantially coincident with the entire region 54 of the attention person.

The transfer region detection unit 28 detects an attention person transfer region (rectangular region) 56 of the moving image in the still image having the evaluation value equal to or greater than the threshold value, on the basis of the movement trajectory of the attention person, as illustrated in FIG. 14 (Step S14).

The region detection unit 12 determines that the face region 52 of the attention person and the attention person movement region 50 of the moving image are the most important regions. In addition, the region detection unit 12 determines that the entire region 54 of the attention person and the attention person transfer region 56 of the moving image are important regions. However, in this embodiment, the entire region 54 of the attention person is treated to have a higher importance than the attention person transfer region 56 of the moving image. The importance of each region can be arbitrarily set.

As described above, the region detection unit 12 can output a still image having an evaluation value equal to or greater than the threshold value as the still image corresponding to the best shot scene from the moving image and can detect, for example, the face region of the attention person, the attention person movement region of the moving image, the entire region of the attention person, and the attention person transfer region of the moving image in the still image having the evaluation value equal to or greater than the threshold value.

Figure 12:
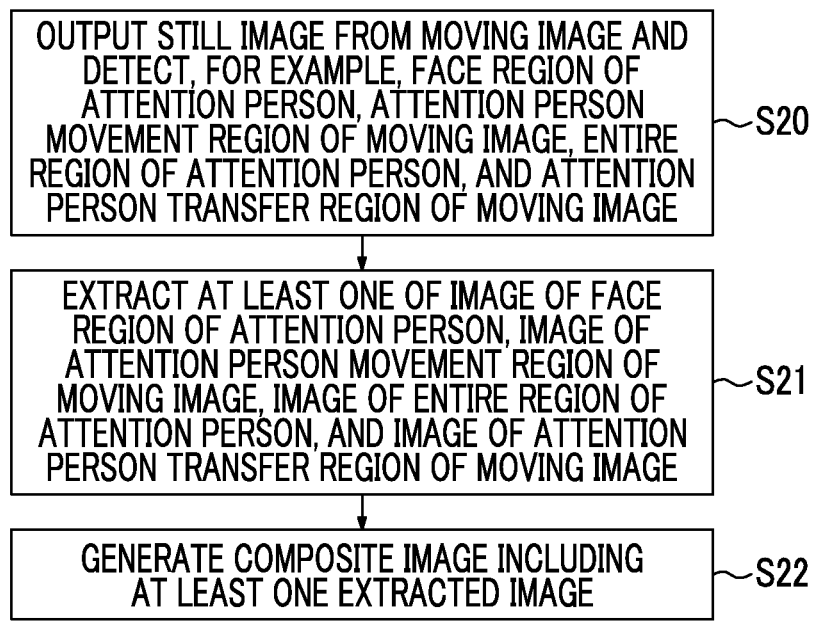
FIG. 12 is a flowchart illustrating an example of the operation of the image processing apparatus illustrated in FIG. 1.

Next, the operation of the image processing apparatus 10 will be described with reference to the flowchart illustrated in FIG. 12.

In the image processing apparatus 10, as described above, the region detection unit 12 outputs a still image having an evaluation value equal to or greater than the threshold value from a plurality of still images extracted from the moving image and detects, for example, the face region of the attention person, the attention person movement region of the moving image, the entire region of the attention person, and the attention person transfer region of the moving image in the still image having the evaluation value equal to or greater than the threshold value (Step S20).

Then, the region image extraction unit 14 extracts at least one of the image of the face region of the attention person, the image of the attention person movement region of the moving image, the image of the entire region of the attention person, and the image of the attention person transfer region of the moving image which respectively correspond to the face region of the attention person, the attention person movement region of the moving image, the entire region of the attention person, and the attention person transfer region of the moving image from the still image having the evaluation value equal to or greater than the threshold value (Step S21).

Then, the composite image generation unit 16 generates a composite image including the at least one extracted image (Step S22).

As described above, the image processing apparatus 10 can output a still image having an evaluation value equal to or greater than the threshold value from a plurality of still images extracted from the moving image and generate a composite image including at least one of the image of the face region of the attention person, the image of the attention person movement region of the moving image, the image of the entire region of the attention person, and the image of the attention person transfer region of the moving image in the still image having the evaluation value equal to or greater than the threshold value.

Next, a process in case where the composite image is generated will be described.

In case where the transfer region detection unit 28 detects the attention person transfer region of the moving image, the region image extraction unit 14 can extract at least one of the image of the face region of the attention person, the image of the attention person movement region of the moving image, the image of the entire region of the attention person, and the image of the attention person transfer region of the moving image from the still image having the evaluation value equal to or greater than the threshold value.

Therefore, the composite image generation unit 16 can generate a composite image including at least one of the image of the face region of the attention person, the image of the attention person movement region of the moving image, the image of the entire region of the attention person, and the image of the attention person transfer region of the moving image in the still image having the evaluation value equal to or greater than the threshold value.

In this case, for example, the region image extraction unit 14 extracts the image of the attention person transfer region of the moving image from the still image having the evaluation value equal to or greater than the threshold value and the composite image generation unit 16 generates a composite image including the image of the attention person transfer region of the moving image.

On the other hand, in case where the transfer region detection unit 28 does not detect the attention person transfer region of the moving image, the region image extraction unit 14 can extract the image of the face region of the attention person, the image of the attention person movement region of the moving image, and the image of the entire region of the attention person from the still image having the evaluation value equal to or greater than the threshold value.

Therefore, the composite image generation unit 16 can generate a composite image including at least one of the image of the face region of the attention person, the image of the attention person movement region of the moving image, and the image of the entire region of the attention person in the still image having the evaluation value equal to or greater than the threshold value.

In this case, for example, the region image extraction unit 14 extracts the image of the entire region of the attention person from the still image having the evaluation value equal to or greater than the threshold value and the composite image generation unit 16 generates a composite image including the image of the entire region of the attention person.

In case where another image is superimposed on the image of the attention person transfer region of the moving image and is automatically combined with the image, the composite image generation unit 16 may change the image of the region with which another image can be superimposed and combined, on the basis of the importance of a region including the face region of the attention person, the attention person movement region of the moving image, the entire region of the attention person, and the attention person transfer region of the moving image.

For example, the following structure can be used: another image is allowed to be superimposed and combined with the image of the attention person movement region of the moving image and is not allowed to be superimposed and combined with the image of the entire region of the attention person. That is, in this case, the composite image generation unit 16 can superimpose another image on the image of a region other than the entire region of the attention person (including the face region of the attention person and the attention person movement region of the moving image) and combine the images.

The image of a region, with which another image is allowed to be superimposed and combined or another image is not allowed to be superimposed and combined, can be arbitrarily set on the basis of the importance of the image of each region.

Figure 15:
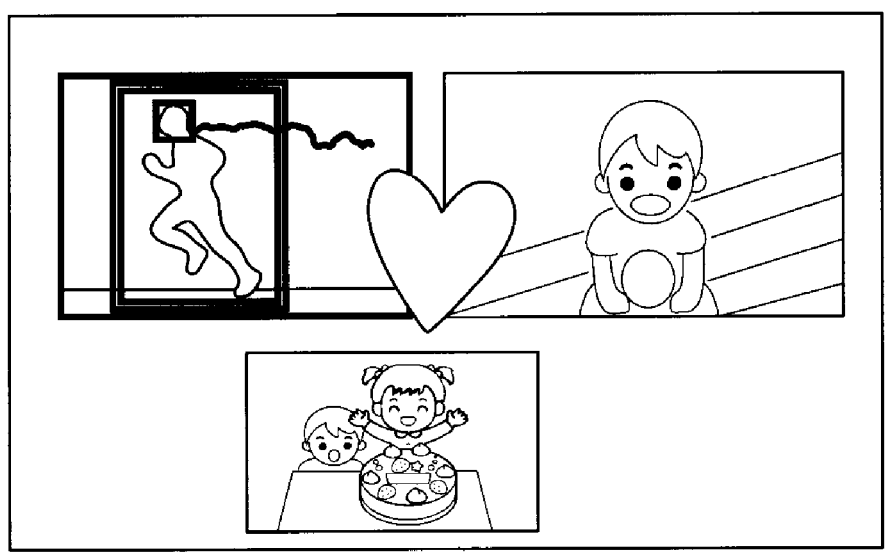
FIG. 15 is a conceptual diagram illustrating an example in which another image is superimposed and combined with the image of the attention person movement region of the moving image.
Figure 16:
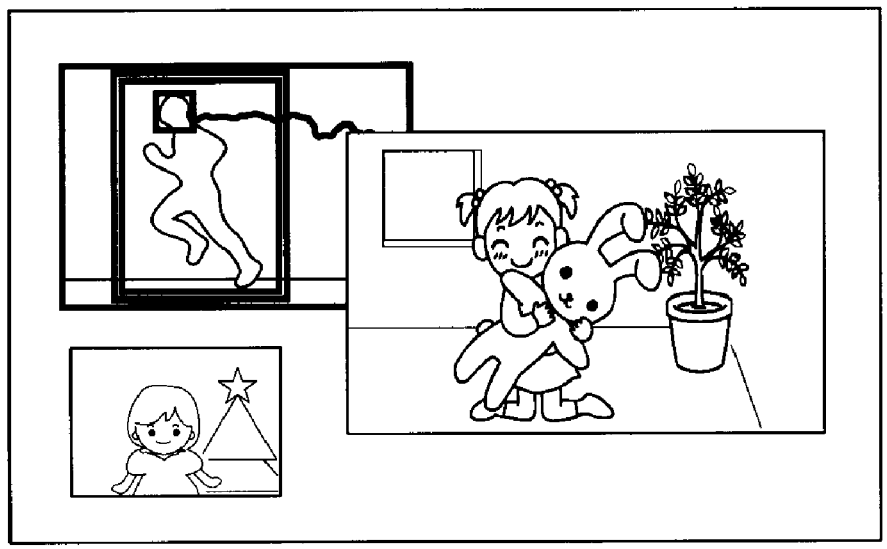
FIG. 16 is a conceptual diagram illustrating another example in which another image is superimposed and combined with the image of the attention person movement region of the moving image.

Another image may be a decoration image including a clip art illustrated in FIG. 15, comments, and a pattern or may be the image of a region which is extracted from another still image having an evaluation value equal to or greater than the threshold value, as illustrated in FIG. 16.

In case where another image is superimposed and combined with the image of the attention person transfer region of the moving image in response to an instruction from the user, it can be superimposed at an arbitrary position on an arbitrary image and can be combined with the arbitrary image. That is, in this case, the composite image generation unit 16 can superimpose an image, which is designated by an instruction input through the instruction input unit 18, on the image of the attention person transfer region of the moving image at a position which is designated by the instruction and combine the images.

In case where another image is superimposed on the image of the attention person transfer region of the moving image and is automatically combined with the image, the composite image generation unit 16 may change the image of the region, with which another image is superimposed and combined, among the image of a region other than the face region of the attention person and the attention person movement region of the moving image, the image of a region other than the entire region of the attention person, and the image of a region other than the attention person transfer region of the moving image, depending on the purpose of the composite image.

For example, since the attention person movement region of the moving image and the face region of the attention person have the highest importance, another image is not allowed to be superimposed and combined with the images of these regions and is allowed to be superimposed and combined with the image of the entire region of the attention person.

The image of the region, with which another image is allowed to be superimposed and combined or is not allowed to be superimposed and combined, can be arbitrarily set depending on the purpose of the composite image.

Examples of the purpose of the composite image include a photo book, a shuffle print (a plurality of images are randomly arranged on one mount), a post card, and a general photographic print.

In case where another image is superimposed on the image of the attention person transfer region of the moving image and is automatically combined with the image, the composite image generation unit 16 may change the image of the region, with which another image is superimposed and combined, among the image of the region other than the face region of the attention person and the attention person movement region of the moving image, the image of the region other than the entire region of the attention person, and the image of the region other than the attention person transfer region of the moving image, depending on the type of another image.

Examples of the type of another image include a decoration image including, for example, a clip art, comments, and a pattern or the image of a region which is extracted from another still image having an evaluation value equal to or greater than the threshold value, as described above.

For example, the clip art can be allowed to be superimposed and combined with the image of the region other than the entire region of the attention person and the image of the region which is extracted from another still image having the evaluation value equal to or greater than the threshold value can be allowed to be superimposed and combined with the image of the region other than the face region of the attention person and the attention person movement region of the moving image.

The image of the region, with which another image is allowed or not allowed to be superimposed and combined, can be arbitrarily set, according to the type of another image.

As described above, the movement trajectory detection unit 36 can detect the transfer direction of the attention person or the transfer speed of the attention person, using, for example, the motion history image.

In this case, the region image extraction unit 14 may extend the extraction range in the transfer direction of the attention person as the transfer speed of the attention person increases and extract the image of the attention person transfer region of the moving image.

Figure 17A:
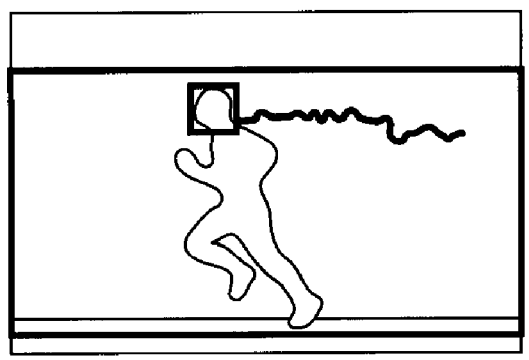
FIGS. 17A and 17B are conceptual diagrams illustrating an example in which an extraction range is changed in the transfer direction of the attention person, depending on the transfer speed of the attention person.
Figure 17B:
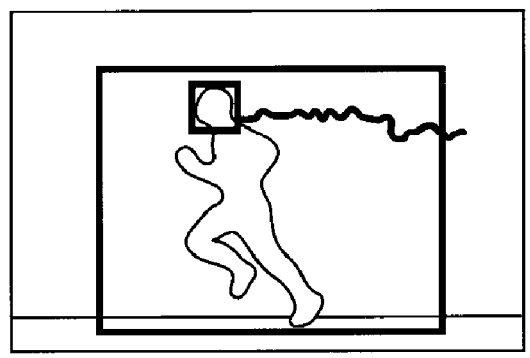

For example, in case where the transfer speed of the attention person is relatively high, the region image extraction unit 14 extends the extraction range in the transfer direction of the attention person, as illustrated in FIG. 17A. On the other hand, in case where the transfer speed of the attention person is relatively low, the region image extraction unit 14 narrows the extraction range in the transfer direction of the attention person, as illustrated in FIG. 17B.

According to this structure, in case where the attention person runs or walks to move, the user who views the composite image can feel the transfer speed of the attention person according to the extraction range in the transfer direction of the attention person.

Figure 18:
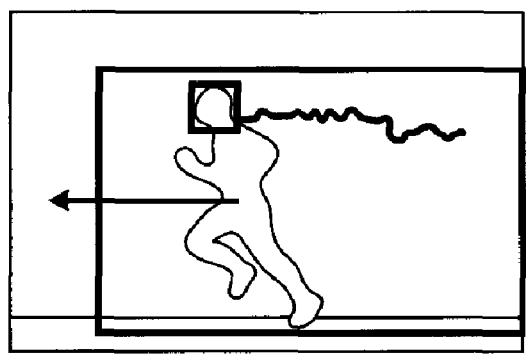
FIG. 18 is a conceptual diagram illustrating an example in which the extraction range is changed in the transfer direction of the attention person and a direction opposite to the transfer direction, depending on the transfer speed of the attention person.

In case where the attention person is transferring, the region image extraction unit 14 may extract the image of the attention person transfer region of the moving image such that an extraction range in a direction opposite to the transfer direction of the attention person is wider than the extraction range in the transfer direction of the attention person, as illustrated in FIG. 18.

Similarly, in case where the attention person is transferring, the user who views the composite image can feel the transfer speed of the attention person in the still image having the evaluation value equal to or greater than the threshold value according to the extraction ranges in the transfer direction of the attention person and the direction opposite to the transfer direction.

The region image extraction unit 14 may extract at least two of the image of the face region of the attention person, the image of the attention person movement region of the moving image, the image of the entire region of the attention person, and the image of the attention person transfer region of the moving image from one still image having an evaluation value equal to or greater than the threshold value.

Therefore, the composite image generation unit 16 can generate a composite image including the at least two images extracted by the region image extraction unit 14.

In this case, as illustrated in FIG. 19, for example, the image of the attention person movement region of the moving image and the image of the entire region of the attention person can be extracted from one still image having an evaluation value equal to or greater than the threshold value and a composite image, such as a photo collage, including the two extracted region images can be generated.

In this case, since the face region of the attention person has the highest importance, for example, the image of the entire region of the attention person including the face region may be arranged in a large region of the composite image and the image of the attention person movement region of the moving image which does not include the face region may be arranged in a small region of the composite image.

In case where the composite image is generated, the composite image generation unit 16 may perform image processing, such as trimming, enlargement, reduction, and image correction, for the image extracted by the region image extraction unit 14 to generate a composite image including the image subjected to the image processing.

Each component of the device according to the invention may be formed by dedicated hardware or a programmed computer.

A method according to the invention can be performed by, for example, a program which causes a computer to perform each step of the method. In addition, the program which causes the computer to perform each step of the method may be provided as a software as a service (SaaS) on the Internet. A computer-readable recording medium having the program recorded thereon may be provided.

The invention basically has the above-mentioned structure.

The invention has been described in detail above. However, the invention is not limited to the above-described embodiment and various modifications and changes of the invention can be made without departing from the scope and spirit of the invention.

What is claimed is:
1. A region detection device comprising:
   at least one processor configured to:
      extract a plurality of frames of still image data from moving image data, detect an attention person, who is a person to be processed, from a plurality of still images corresponding to the plurality of frames of still image data, track a movement of the attention person in a moving image corresponding to the moving image data, on the basis of the detection result of the attention person in the plurality of still images, and detect a movement trajectory of the attention person, analyze a motion of the attention person in the moving image, on the basis of the movement trajectory of the attention person, and calculate an evaluation value for the motion of the attention person in each of the plurality of still images, on the basis of the analyzed motion of the attention person, output the still image data of a still image in which the evaluation value for the motion of the attention person is equal to or greater than a threshold value from the plurality of frames of still image data, detect an attention person movement region of the moving image captured in the still image in which the evaluation value is equal to or greater than the threshold value, on the basis of the movement trajectory of the attention person, detect a face region of the attention person in the still image in which the evaluation value is equal to or greater than the threshold value, and detect an entire region of the attention person in the still image in which the evaluation value is equal to or greater than the threshold value, on the basis of the attention person movement region of the moving image and the face region of the attention person.

2. The region detection device according to claim 1, wherein the at least one processor is further configured to:
detect an attention person transfer region of the moving image in the still image in which the evaluation value is equal to or greater than the threshold value, on the basis of the movement trajectory of the attention person.

3. An image processing apparatus comprising:
the region detection device according to claim 2,
wherein the at least one processor is further configured to:
extract at least one of an image of the face region of the attention person, an image of the attention person movement region of the moving image, an image of the entire region of the attention person, and an image of the attention person transfer region of the moving image, which respectively correspond to the face region of the attention person, the attention person movement region of the moving image, the entire region of the attention person, and the attention person transfer region of the moving image, from the still image in which the evaluation value is equal to or greater than the threshold value, and generate a composite image including the at least one image extracted by the region image extraction unit.

4. The image processing apparatus according to claim 3, wherein, when the at least one processor detects the attention person transfer region of the moving image, the at least one processor extracts the image of the attention person transfer region of the moving image from the still image in which the evaluation value is equal to or greater than the threshold value, and the at least one processor generates a composite image including the image of the attention person transfer region of the moving image.

5. The image processing apparatus according to claim 4, wherein, when another image is automatically superimposed and combined with the image of the attention person transfer region of the moving image, the at least one processor superimposes the image on an image of a region other than the entire region of the attention person and combines the images.

6. The image processing apparatus according to claim 4, wherein, when another image is automatically superimposed and combined with the image of the attention person transfer region of the moving image, the at least one processor changes an image of a region, with which the image is superimposed and combined, from an image of a region other than the face region of the attention person and the attention person movement region of the moving image, an image of a region other than the entire region of the attention person, and an image of a region other than the attention person transfer region of the moving image, depending on the purpose of the composite image.

7. The image processing apparatus according to claim 4, wherein, when another image is automatically superimposed and combined with the image of the attention person transfer region of the moving image, the at least one processor changes an image of a region, with which the image is superimposed and combined, from an image of a region other than the face region of the attention person and the attention person movement region of the moving image, an image of a region other than the entire region of the attention person, and an image of a region other than the attention person transfer region of the moving image, depending on the type of image to be superimposed and combined.

8. The image processing apparatus according to claim 4, wherein the at least one processor is further configured to
receive an instruction input by a user, and
superimpose an image designated by the instruction on the image of the attention person transfer region of the moving image at a position designated by the instruction and combines the images.

9. The image processing apparatus according to claim 4, wherein the at least one processor is further configured to
detect a transfer direction and a transfer speed of the attention person, and
extend an extraction range in the transfer direction of the attention person as the transfer speed of the attention person increases and extracts the image of the attention person transfer region of the moving image.

10. The image processing apparatus according to claim 9, wherein the at least one processor is configured to extract the image of the attention person transfer region of the moving image such that an extraction range in a direction opposite to the transfer direction of the attention person is wider than the extraction range in the transfer direction of the attention person.

11. The image processing apparatus according to claim 3, wherein the at least one processor is configured to
extract at least two of the image of the face region of the attention person, the image of the attention person movement region of the moving image, the image of the entire region of the attention person, and the image of the attention person transfer region of the moving image from one still image in which the evaluation value is equal to or greater than the threshold value, and generate a composite image including the at least two images extracted by the region image extraction unit.

12. The image processing apparatus according to claim 3, wherein the at least one processor is configured to perform image processing for the image extracted by the at least one processor and generate a composite image including the image subjected to the image processing.

13. The image processing apparatus according to claim 4, wherein the at least one processor is configured to perform image processing for the image extracted by the at least one processor and generate a composite image including the image subjected to the image processing.

14. The image processing apparatus according to claim 5, wherein the at least one processor is configured to perform image processing for the image extracted by the at least one processor and generate a composite image including the image subjected to the image processing.

15. The image processing apparatus according to claim 3, wherein, when the attention person transfer region of the moving image is not detected by the transfer region detection unit, the at least one processor is configured to
   extract the image of the entire region of the attention person from the still image in which the evaluation value is equal to or greater than the threshold value, and
   generate a composite image including the image of the entire region of the attention person.

16. A region detection method comprising:
   extracting a plurality of frames of still image data from moving image data;
   detecting an attention person, who is a person to be processed, from a plurality of still images corresponding to the plurality of frames of still image data;
   tracking a movement of the attention person in a moving image corresponding to the moving image data, on the basis of the detection result of the attention person in the plurality of still images, and detecting a movement trajectory of the attention person;
   analyzing a motion of the attention person in the moving image, on the basis of the movement trajectory of the attention person, and calculating an evaluation value for the motion of the attention person in each of the plurality of still images, on the basis of the analyzed motion of the attention person;
   outputting the still image data of a still image in which the evaluation value for the motion of the attention person is equal to or greater than a threshold value from the plurality of frames of still image data;
   detecting an attention person movement region of the moving image captured in the still image in which the evaluation value is equal to or greater than the threshold value, on the basis of the movement trajectory of the attention person;
   detecting a face region of the attention person in the still image in which the evaluation value is equal to or greater than the threshold value; and
   detecting an entire region of the attention person in the still image in which the evaluation value is equal to or greater than the threshold value, on the basis of the attention person movement region of the moving image and the face region of the attention person.

17. The region detection method according to claim 16, further comprising:
   detecting an attention person transfer region of the moving image in the still image in which the evaluation value is equal to or greater than the threshold value, on the basis of the movement trajectory of the attention person.

18. An image processing method comprising:
   extracting the face region of the attention person, the attention person movement region of the moving image, the entire region of the attention person, and the attention person transfer region of the moving image using the region detection method according to claim 17;
   extracting at least one of an image of the face region of the attention person, an image of the attention person movement region of the moving image, an image of the entire region of the attention person, and an image of the attention person transfer region of the moving image, which respectively correspond to the face region of the attention person, the attention person movement region of the moving image, the entire region of the attention person, and the attention person transfer region of the moving image, from the still image in which the evaluation value is equal to or greater than the threshold value; and
   allowing a composite image generation unit to generate a composite image including the at least one extracted image.

19. A non-transitory computer-readable recording medium storing a program that causes a computer to perform the region detection method according to claim 16.

20. A non-transitory computer-readable recording medium storing a program that causes a computer to perform the image processing method according to claim 18.

* * * * *